(12) United States Patent
Lau et al.

(10) Patent No.: US 6,313,834 B1
(45) Date of Patent: Nov. 6, 2001

(54) MULTI-FORMAT AND MULTI-VIEW SYNCHRONIZED DATA EDITOR

(76) Inventors: Rebecca Mei-Har Lau; Kevin Jon Poole, both of 5719 Saxony Ct., San Jose, CA (US) 95123; Sheila I. Sholars, 801-B8 Nash Rd., Hollister, CA (US) 95023

( * ) Notice: Subject to any disclaimer, the term of this patent is extended or adjusted under 35 U.S.C. 154(b) by 0 days.

(21) Appl. No.: 09/197,916

(22) Filed: Nov. 23, 1998

(51) Int. Cl.[7] .............................. G06F 3/00; G06F 17/30
(52) U.S. Cl. ........................................ 345/343; 707/102
(58) Field of Search .................................... 345/326, 339, 345/340, 343, 346, 356, 968; 707/1, 102, 100, 200, 505, 506, 507, 508, 514, 522, 523, 524

(56) References Cited

U.S. PATENT DOCUMENTS

| | | | | |
|---|---|---|---|---|
| 4,686,649 | * | 8/1987 | Rush et al. | 707/517 |
| 4,802,104 | * | 1/1989 | Ogiso | 707/517 |
| 5,999,937 | * | 12/1999 | Ellard | 707/101 |
| 6,028,602 | * | 2/2000 | Weidenfeller et al. | 345/340 |

* cited by examiner

*Primary Examiner*—Crescelle N. dela Torre

(57) ABSTRACT

A method, apparatus, and article of manufacture, and a memory structure for displaying a data file is disclosed. The apparatus displays a window, comprising two synchronized window portions: an unformatted window portion showing unformatted data and a formatted window portion showing the same data as the current record formatted according to a data structure described in data structure file.

25 Claims, 9 Drawing Sheets

MULTI-FORMAT AND MULTI-VIEW SYNCHRONIZED DATA EDITOR

CROSS-REFERENCE TO RELATED APPLICATIONS

This application is related to the following co-pending and commonly assigned patent application:

application Ser. No. 09/197,612, entitled "DATA FILE EDITOR PRESENTING SEMI-FORMATTED VIEW," filed on Nov. 23, 1998, now U.S. Pat. No. 6,192,367, issued on Feb. 20, 2001 by Allen K. Hawley and Sheila I. Sholars, which application is hereby incorporated by reference herein.

BACKGROUND OF THE INVENTION

1. Field of the Invention

The present invention relates to systems and methods of displaying data, and in particular to a method and system for synchronously viewing and editing data in both unformatted and formatted form.

2. Description of the Related Art

The Virtual Storage Access Method (VSAM) is a method for accessing data using a B+ tree organizational structure. VSAM data files include one or more VSAM data records, each with a plurality of data fields.

VSAM data records and their fields are editable by VSAM data editors. Although these editors provide a basic capability to allow users to edit VSAM data records, they are awkwardly designed and implemented. For example, current VSAM editors allow the user to edit formatted data fields of a data record one at a time, but they do not easily permit the user to view other data records in the VSAM file during editing. Since current VSAM editors only present one record at a time, they do not lend themselves to the detection of duplication errors or ease of data entry. This raises the possibility that the user will enter a substantial amount of input to create or edit the file, only to find out that the record that they wish to create or update already exists in the data file.

The user may attempt to ameliorate this problem by opening another window or by replacing the current display, but this solution is far from optimal, because the information presented in the windows will not be synchronized, and no synchronization between the data records or the structure of the data records presented in the windows will result.

As can be seen from the foregoing, there is a need to provide a quick and intuitive interface for editing VSAM files that can display all or a subset of the records in the data file as well as in parallel, and provide the capability to access a specific record in the workspace of the editor. The multiple record browser and editor disclosed herein satisfies that need by providing capability to simultaneously view a single record as well as view a list of records pertaining to their opened VSAM data file without loss of context. Further, the multiple record browser and editor displays the relationship between the data record, its fields, and the structure for the data record, as defined in a COBOL copy file. The multiple record browser thus permits the user to quickly and visually identify whether or not the record they wish to create or update already exists in the file, thus eliminating the frustration of taking the time to enter all of the data for a new or modified record only to find that a duplicate already exists.

SUMMARY OF THE INVENTION

To address the requirements described above, the present invention discloses a method, apparatus, article of manufacture for displaying a data file with a plurality of records. The apparatus comprises a monitor, communicatively coupled to a computer, a window, displayable on the monitor, the window comprising an unformatted window portion and a formatted window portion. The formatted window portion displays a formatted view of a data record structured according to a data descriptor and synchronized with the unformatted view of the data record. The unformatted window portion displays the data records as found in the data.

The method comprises the steps of opening a first file having record structure information, opening a data file, and displaying a single window comprising an unformatted window portion displaying an unformatted view of the data records and a formatted window portion displaying a view of a data record formatted according to the record structure file. The article of manufacture comprises a data storage device tangibly embodying instructions to perform these method steps.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
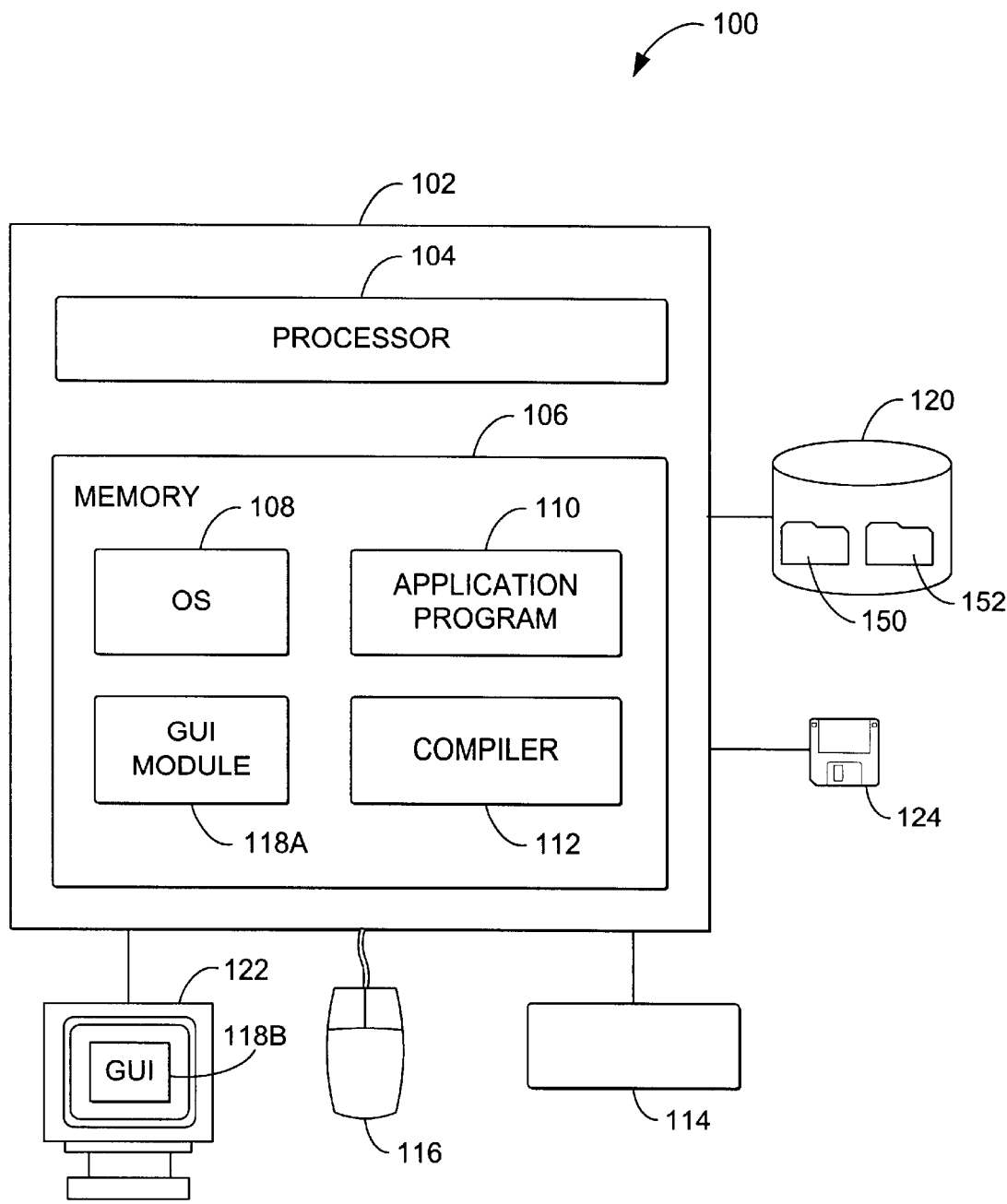
FIG. 1 is a block diagram showing an exemplary hardware environment for practicing the present invention.

FIG. 1 illustrates an exemplary computer system 100 used to implement a multiple browser and editor. The computer 102 comprises a processor 104 and a memory 106, such as random access memory (RAM). The computer 102 is operatively coupled to a display 122, which presents images to the user. The computer 102 may be coupled to other devices, such as a keyboard 114, a mouse device 116, a printer, or similar I/O device. Any combination of the above components, or any number of different components, peripherals, and other devices, may be used with the computer 102.

Generally, the user interfaces with the computer which accepts inputs and commands and presents results through a graphical user interface (GUI) module 118A and GUI 118B. Although the GUI module 118A is depicted as a separate module, the instructions performing the GUI functions can be resident or distributed in the operating system 108, the application program 110, or implemented with special purpose memory and/or processors.

The operating system 108 and computer application program 110 are comprised of instructions which, when read and executed by the computer 102, causes the computer 102 to perform the steps necessary to implement and/or use the present invention. Computer program 110 and/or operating instructions may also be tangibly embodied in memory 106 and/or provided via data communications devices, thereby making a computer program product or article of manufacture according to the invention. As such, the terms "article of manufacture" and "computer program product" as used herein are intended to encompass a computer program accessible from any computer readable device or media. In one embodiment, instructions implementing the operating system 108, the computer program 110, and the compiler 112 are tangibly embodied in a computer-readable medium, e.g., data storage device 120, such as one or more fixed or removable data storage devices, a zip drive, floppy disc drive 124, hard drive, CD-ROM drive, tape drive, or other medium.

The computer 102 may also implement a compiler 112 which allows an application program 110 written in a programming language such as COBOL, C++, FORTRAN, or other language to be translated into processor 104 readable code. After completion, the application program 110 accesses and manipulates data stored in the memory 106 of the computer 102 using the relationships and logic that was generated using the compiler 112.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Overview

The present invention comprises a multiple data record browser and editor that allows the user to edit data files, such as Virtual Storage Access Method (VSAM) files, from the user's workstation. VSAM is a widely used data storage method that uses a B+ data organization tree. The data file browser/editor provides a graphical interface that displays the data file in both unformatted and formatted forms simultaneously in the same window. Formatted records in the data file are displayed one at a time according to a data description such as a COBOL copy file, and unformatted records are displayed as character strings as found in the data file.

The data file browser/editor allows the user to specify how the records are displayed. For example, the data records may be displayed in ASCII (American National Standard Code for Information Interchange), or EBCDIC (Extended Binary Coded Decimal Interchange Code). These views can be additionally extended to show its hexadecimal form. The data file browser/editor also allows the user to edit the record regardless of the code or the formatting selected. Data files are displayed as records in the window for the user to view, browse, edit, or delete. Provision is made for adding new records to the data file, creating new data files, and editing both the formatted and unformatted records.

Presenting Data File Information

Figure 2:
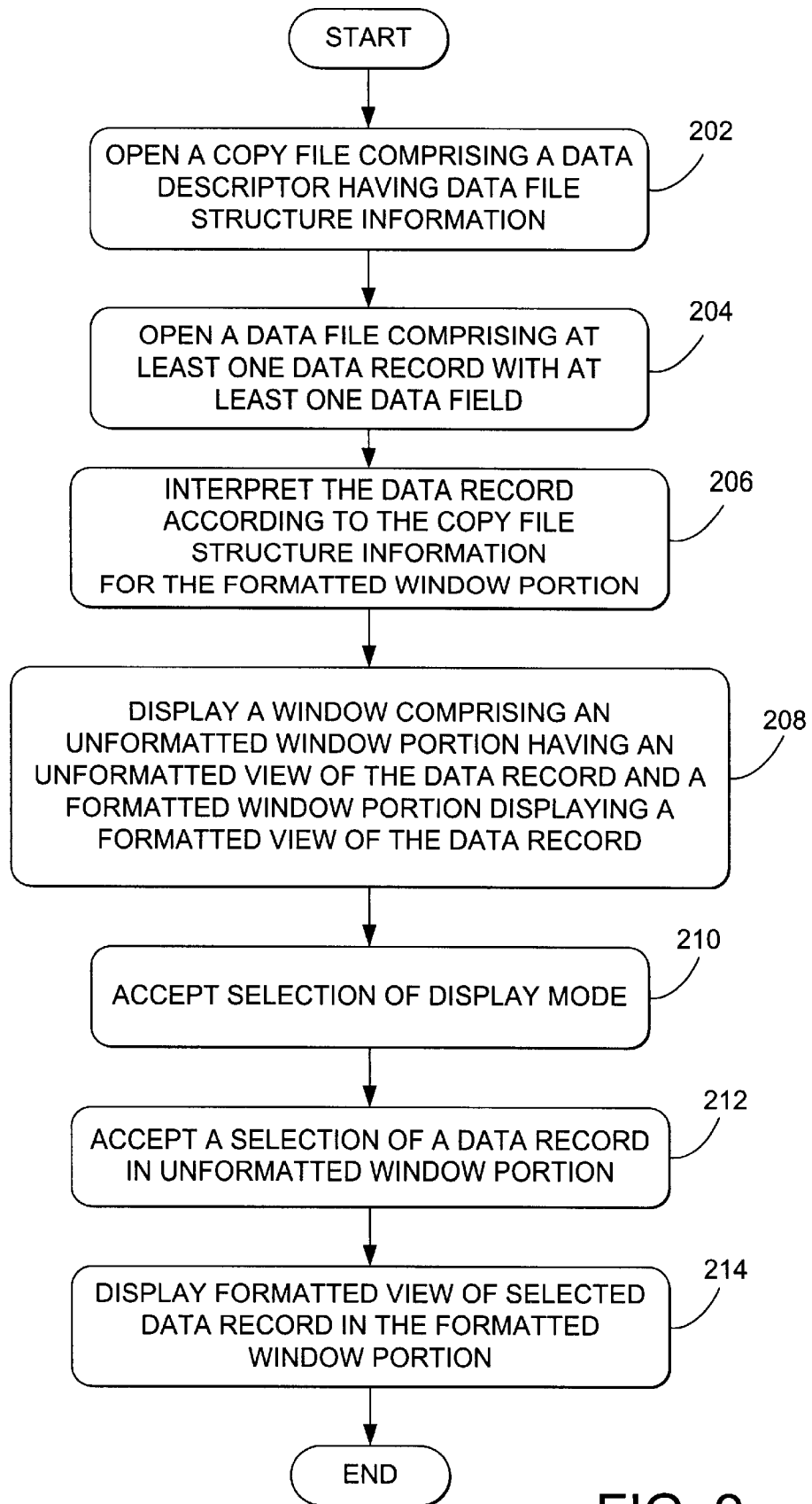
FIG. 2 is a flow chart presenting an illustrative example of process steps used in presenting data file information to the user.

FIG. 2 is a flow chart showing the operations used to present data information to the user. The operations described with respect to FIG. 2 will be described with reference to FIGS. 3–8 to show illustrative embodiments of the data file browser/editor user interface and to show additional operational details.

Figure 3:
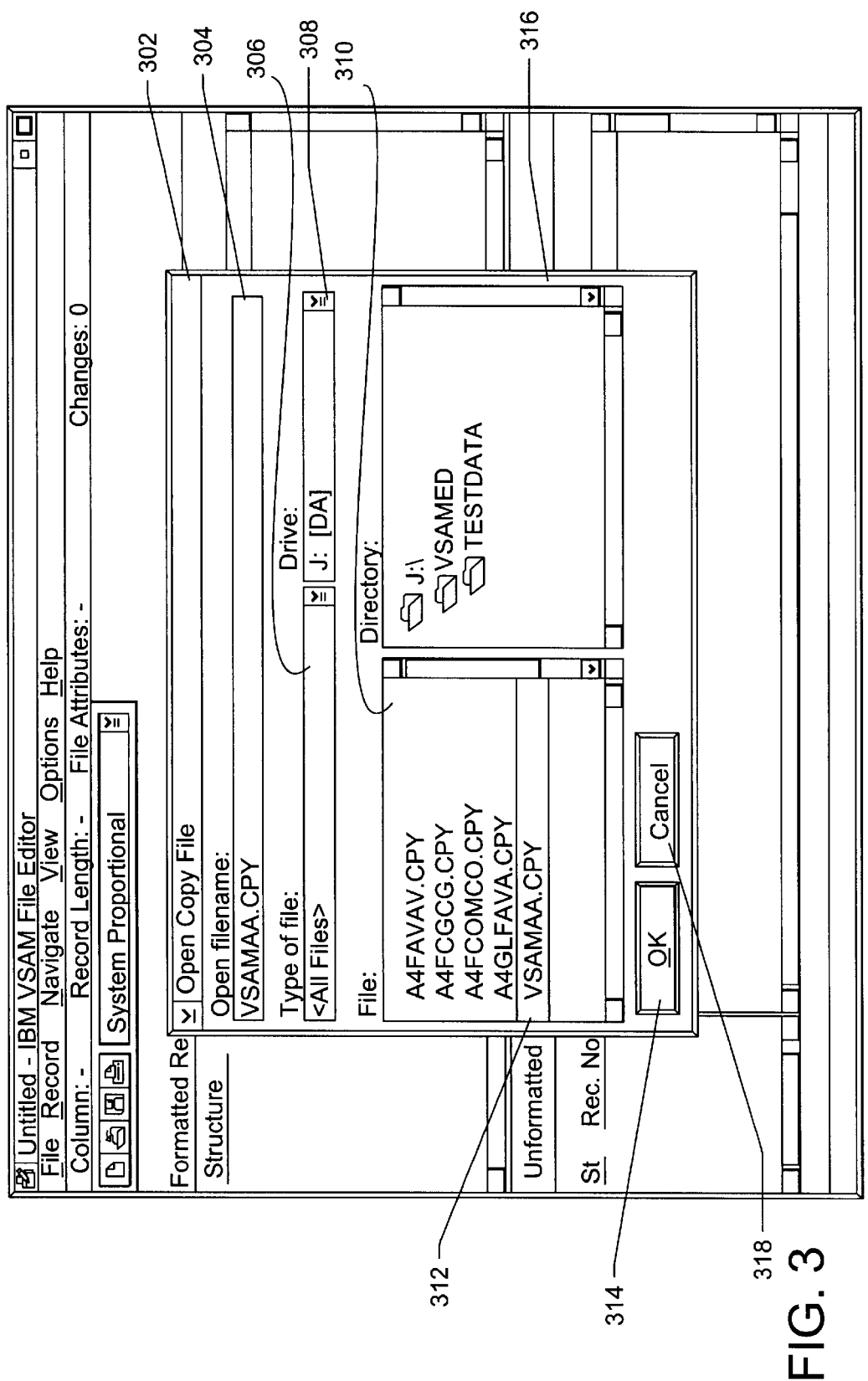
FIG. 3 is a diagram showing an illustrative embodiment of a copy file selection window.
Figure 4:
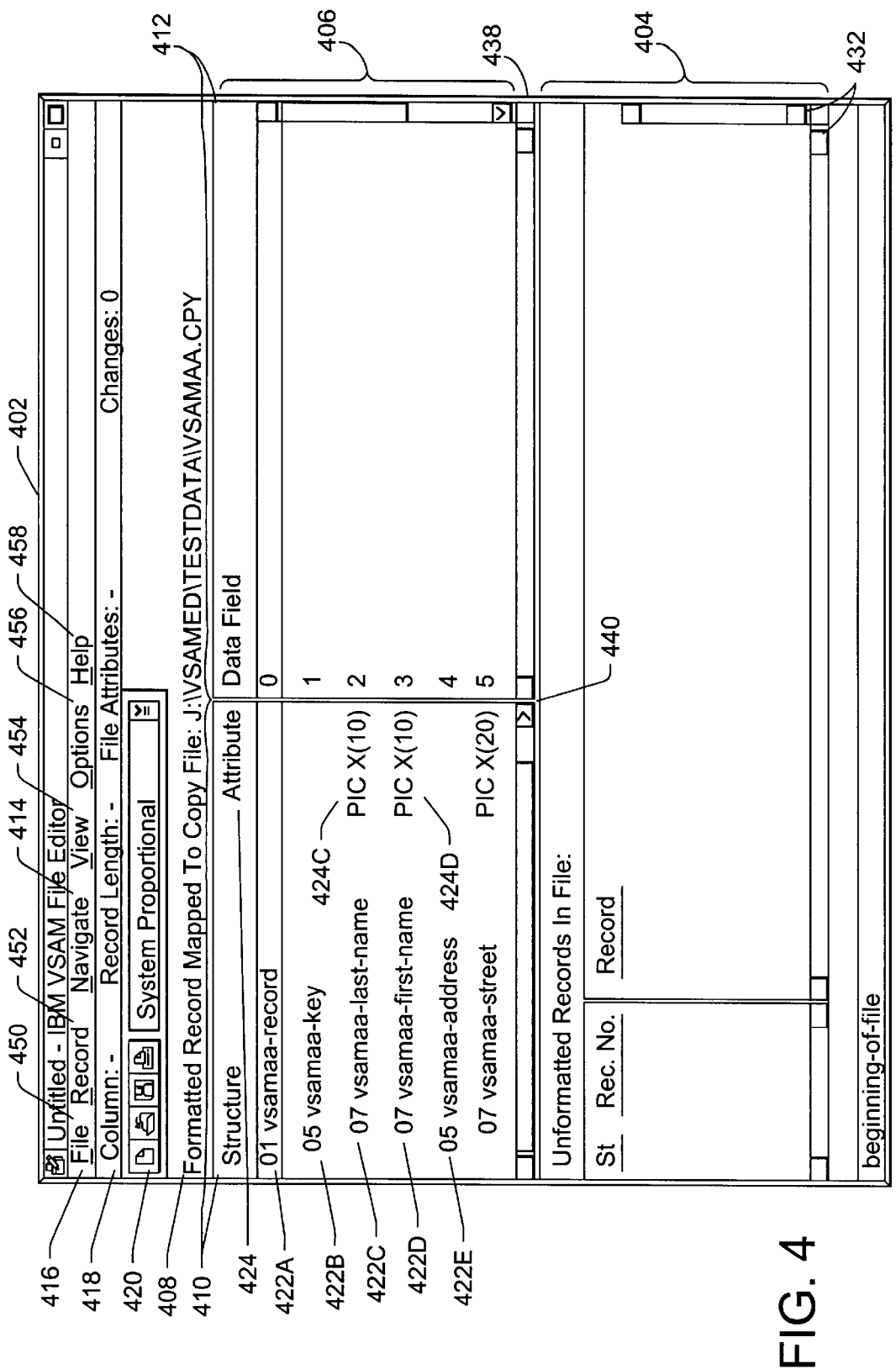
FIG. 4 is a diagram showing an exemplary embodiment of the data file browser/editor interface after opening a copy file.

The process begins by opening a file containing data record structure information. This is depicted in block 202. By way of example, for data used in connection with application programs 106 written in COBOL and complying with VSAM, the opened file is a COBOL copy file 150, and the data file structure information is described in one or more data descriptors and other information stored in the copy file 150. FIGS. 3 and 4 provide illustrative embodiments of a user interface for opening the copy file 150 and a data file browser/editor.

FIG. 3 is a diagram showing an illustrative embodiment of a copy file selection window 302 that can be used to open a file with data file structure information. The copy file selection window 302 comprises a file name entry box 304. The user may specify the desired copy file by typing the path to the copy file in this box. Alternatively, the user may search for the desired file using the directory drive selection box 308, the directory box 316, and the filename list box 312. File names displayed in the filename list box 312 are optionally filtered according to file type using the file type entry box 306. A file selected in the filename list box 312 can be automatically entered into the filename entry box 304 by selecting the desired file.

In the example shown in FIG. 3, a copy file 150 named "VSAMAA.CPY" has been selected for opening. Once the name of the desired file appears in the file name entry box 304, the OK button 314 is depressed, and the selected copy file 150 is displayed in the editor. If the user selects the cancel button 318, the copy file selection window 302 disappears and the copy file 150 is not displayed in the editor.

FIG. 4 shows the appearance of an exemplary embodiment of a data file browser/editor window 402 after the copy file 150 has been selected. The data file browser/editor window 402 comprises a menu bar 416, a status bar 418, and a tool bar 420. The menu bar 416 presents the functions available to the user to select and manage data files and the data records therein. The menu bar 416 also allows the user to navigate through the files and to control the display of data in the data file browser/editor window 402 by selecting the "Navigate" pull down menu item 414.

The status bar 418 reflects the status of the data file. The "Column" entry in the status bar 418 denotes the column position of the cursor during editing. The "Record Length" entry in the status bar 418 indicates the length of the current record. The status bar 418 also indicates the file attributes (such as fixed or variable length, and the maximum record length) the editor is using to display the records and the number of changes. The tool bar 420 comprises buttons that provide shortcuts to frequently used menu bar 418 selections.

The data file browser/editor window 402 also comprises an unformatted data window portion 404, and a formatted data window portion 406. The formatted data window portion 406 displays the current record, formatted according to the copy file 150 data description. Formatted view title area 408 indicates the name of the copy file 150 used to format the record displayed in the formatted data window portion 406.

In one embodiment, the formatted window portion 406 comprises a first formatted window sub-portion 410 and a second formatted window sub-portion 412. The first formatted window sub-portion 410 presents read-only column of data elements known as data descriptors 422A–422E (collectively referred to as data descriptors 422) read from the copy file 150. Data item attributes (collectively referred to as 424) of the data descriptors 422 are optionally displayed in a read-only column adjacent to the data descriptors 422 in the first formatted window sub-portion 410. For example, data descriptor 422C has an attribute 424C of PIC X(10), and attribute 422D is associated with a data descriptor 424D. The first formatted window sub-portion 410 and the second formatted window sub-portion 412 can also be separated by a user-movable split bar 440 and thus implemented as a windows "pane" allowing the boundary between the window sub-portions to be controlled by the user.

Collectively, data descriptors 422 and their associated attributes 424 define the structure of the data in the data files 152. For example, in the embodiment of the data file browser/editor 402 illustrated in FIG. 4, the copy file entitled "VSAMAA.CPY" as described with respect to FIG. 3 has been opened. The "VSAMAA.CPY" file comprises a hierarchical organization of data elements including a "record" data descriptor 422A, encompassing a "key" data descriptor 422B, and an "address" data descriptor 422E. The key data descriptor 422B encompasses a "last-name" data descriptor 422C, and a "first-name" data descriptor 422D, each with a 10 character string attribute. Data descriptors 422A, 422B, and 422E are group items, and data descriptors 422C and 422D are data items. Because the user in the foregoing example elected to begin by opening the copy file 150 first, the second formatted window sub-portion 412 and the unformatted window portion 404 are empty. The user may alternately elect to open the data file (as described below) before opening the copy file 150. In which case, data is read from the data file 152 and is presented to the user in an unformatted form in the unformatted window portion, until such time that a copy file 150 is opened.

The foregoing view of data descriptors presents a hierarchical view of the structure of the data. Although the illustrated example indicates a structure for a COBOL data structure, a similar display of the data structure can be presented for alternative programming languages such as PL/1, C, C++, FORTRAN, or other languages. In these instances, this view provides the user with visibility into inherited attributes and methods. It allows viewing of the different structure classes including any nesting characteristics.

In one embodiment, the copy file is also editable from the first formatted window sub-portion via a copy file editor which allows the user to edit copy file information including attributes and data descriptors.

Figure 5:
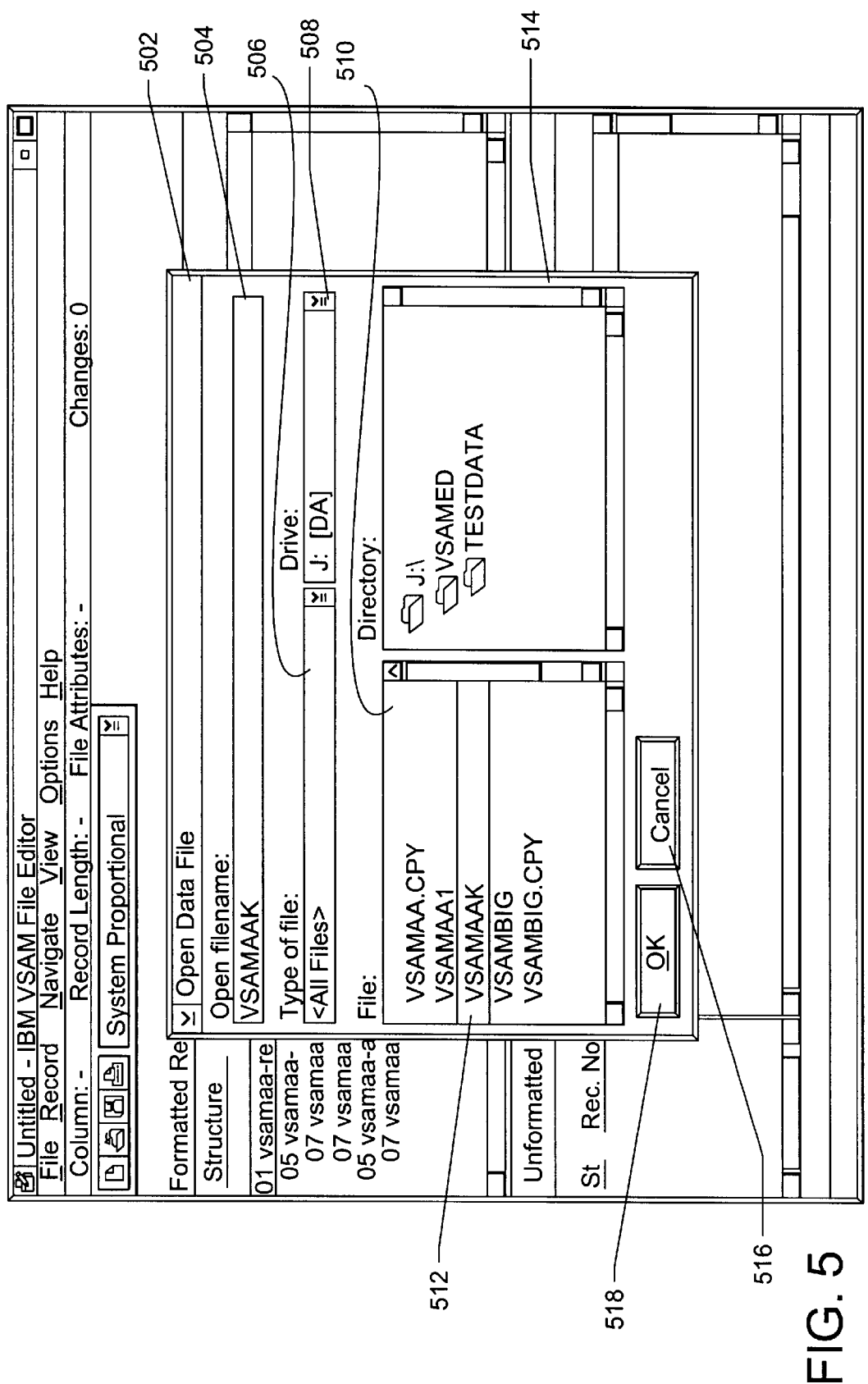
FIG. 5 is a diagram showing an illustrative embodiment of a data file selection window.
Figure 6:
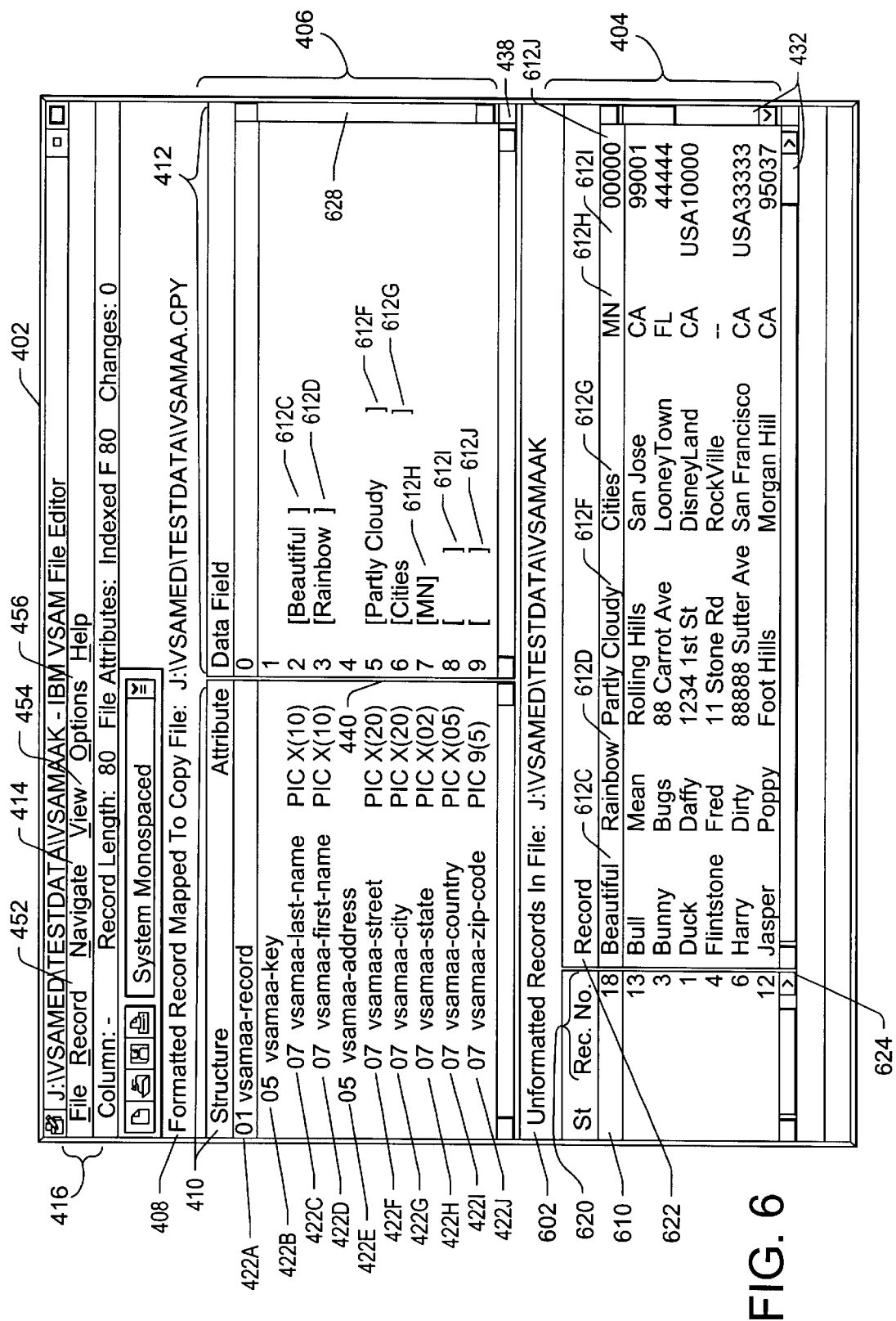
FIG. 6 is a diagram showing an exemplary embodiment of the data file browser/editor after opening a data file and a copy file.

Returning to FIG. 2, the user next opens a data file 152. This is depicted in block 204. The data file comprises at least one data record including at least one data field. FIGS. 5 and 6 provide illustrative embodiments of a user interface for opening the data file 152 and for the appearance of the data file browser/editor window 402 after opening the data file 152.

FIG. 5 is a diagram showing an illustrative embodiment of a data file selection window 502 that can be used to open a data file 152. The data file selection window 502 comprises a data file name entry box 504, in which the user may specify the desired data file 152. Alternatively, the user may search for the desired file using the data file directory drive selection box 508, the data file directory box 514, and the data file filename list box 512. File names displayed in the data file filename list box 512 are optionally filtered according to file type (typically indicated by the file extension) using the data file type entry box 506. A file selected in the filename list box 512 can be automatically entered into the data file filename entry box 504 by selecting the desired file by clicking on it or by other similar means.

In the example shown in FIG. 5, a data file 152 named "VSAMAAK" has been selected for opening. Once the name of the desired file appears in the file name entry box 504, the OK button 518 is depressed, and the selected data file 152 is opened. If the user selects the Cancel button 516, the data file selection window 502 disappears without the data file being opened. If the display of additional copy files or data files are desired, these can also be opened as described above.

If a copy file 150 has not been opened, the data in the data file 152 is interpreted directly from the data file 152 and displayed in the unformatted window portion of the data file browser/editor window 402, without extraneous processing to derive the structure from the copy file 150. If a copy file 150 has been opened, the information in the copy file 150 is used to format the data records of the data file 152 into data fields. This is depicted in block 206 of FIG. 2. After the data records are formatted, the data file browser/editor window 402 is again displayed. Logic representing this operation is depicted in block 208 of FIG. 2.

As shown in block 210 of FIG. 2, the user can select one of several display modes for viewing the unformatted or formatted data, including ASCII or EBCDIC, and hexadecimal via the View pull-down menu 454. Further, the user may provide a selection of a data record in the unformatted window portion 404, and a formatted view of the selected data record will appear in the second formatted window sub-portion 412. Logic representing these operations is presented in blocks 212 and 214.

FIG. 6 is a diagram showing an illustrative embodiment of the data file browser/editor window 402 after both the data file 152 and the copy file 150 have been opened. An unformatted view of the data records read from the data file 152 are presented in the unformatted window portion 404 of the data file browser/editor 402. Record number column 620 shows a number if and only if the record has been saved or exists in the data file 152. Data records can be browsed in the unformatted window portion 404 by using the scroll bars 432 or the pull down Navigate menu 414 in the menu bar 416. Data records can also be selected as the current record by clicking on the desired record. The current record is indicated in the unformatted window portion 404 by delimiting the record. "Delimiting" a record refers to the placing of an identifying designation of the record or field on the display. This can be accomplished by highlighting, as shown in FIG. 6, or by similar means such as special characters.

In the illustrative example shown in FIG. 6, data record 610 has been selected. Selected data record 610 includes a first data field 612C with the data "Beautiful", a second data field 612D with the data "Rainbow---", (where the symbol "-" denotes a space) a third data field 612F with the data "Partly Cloudy------" a fourth data field 612G with the data "Cities------------" a fifth data field 612H with the data "MN", a sixth data field 612I with no data, and a seventh data field 612J with the data "00000".

Data records may also be browsed and selected via the keyboard 114 arrow keys or by selecting the Record pull down menu item 452 and selecting the Next, Previous, or Find menu items. The Find menu item opens a dialog box in which the user may enter text or wildcards, and searches for a data record meeting the entered parameter string requirements.

Upon selection of a data record 610, the data fields 612C–612J (collectively referred to hereinafter as 612) of that record are displayed in the second formatted window sub-portion 412, according to the information in the copy file 150. The field column so presented comprises read only fields (those associated with group items such as 422A, 422B, and 422E) and read-writeable fields (those associated with data items such as 422C, 422D, and 422F–422J). In the illustrated example, the data fields 612 are displayed in separate rows, adjacent to the data descriptors 422 in the copy file 150 associated with each data field. As the user selects an unformatted data record, that data record 610 is formatted according to the information in the copy file 150 and presented in the second formatted window sub-portion 412.

In one embodiment, the data file browser/editor window 402 can accept a selection of a data record and display the selected data record simultaneously in the unformatted data window portion 404 and the formatted data window portion 406. Further, as different data records are selected, the corresponding structure and fields associated with the selected data record can be displayed in the first formatted window sub-portion 410.

In one embodiment, the unformatted data window portion 404 and the formatted data window portion 406 are window "panes" whose size can be altered by selecting the boundary between the "panes" and moving the split bar 438 up and down. If desired, the pane boundary can be moved all the way to the top to hide the formatted window portion 406, or all the way to the bottom to hide the unformatted window portion 404. In addition, the first formatted window sub-portion 410 and the second formatted window sub-portion 412 are also resizeable by selecting the boundary between these "panes" and moving the split bar 440 left and right. If desired, the pane boundary can be moved all the way to the left to hide the first formatted window portion 410, or all the way to the right to hide the second formatted window sub-portion 412.

In another embodiment, the records shown in the unformatted window may be records meeting one or more certain criteria, such as the most recent modification date, or data content. This functionality can be implemented with a search engine.

FIG. 6 also illustrates one of the benefits of the display provided by the data file browser/editor window 402. When illustrated in the unformatted data window 404, the user cannot readily identify the existence or characteristics of the sixth data field 612I since there is no indication where the fifth data field 612H ends. However, using the synchronized view provided by the data editor window 402, the formatted window portion 406 clearly indicates the definition of a five-character data field for the sixth field 612I.

Selecting Data Fields

Figure 7:
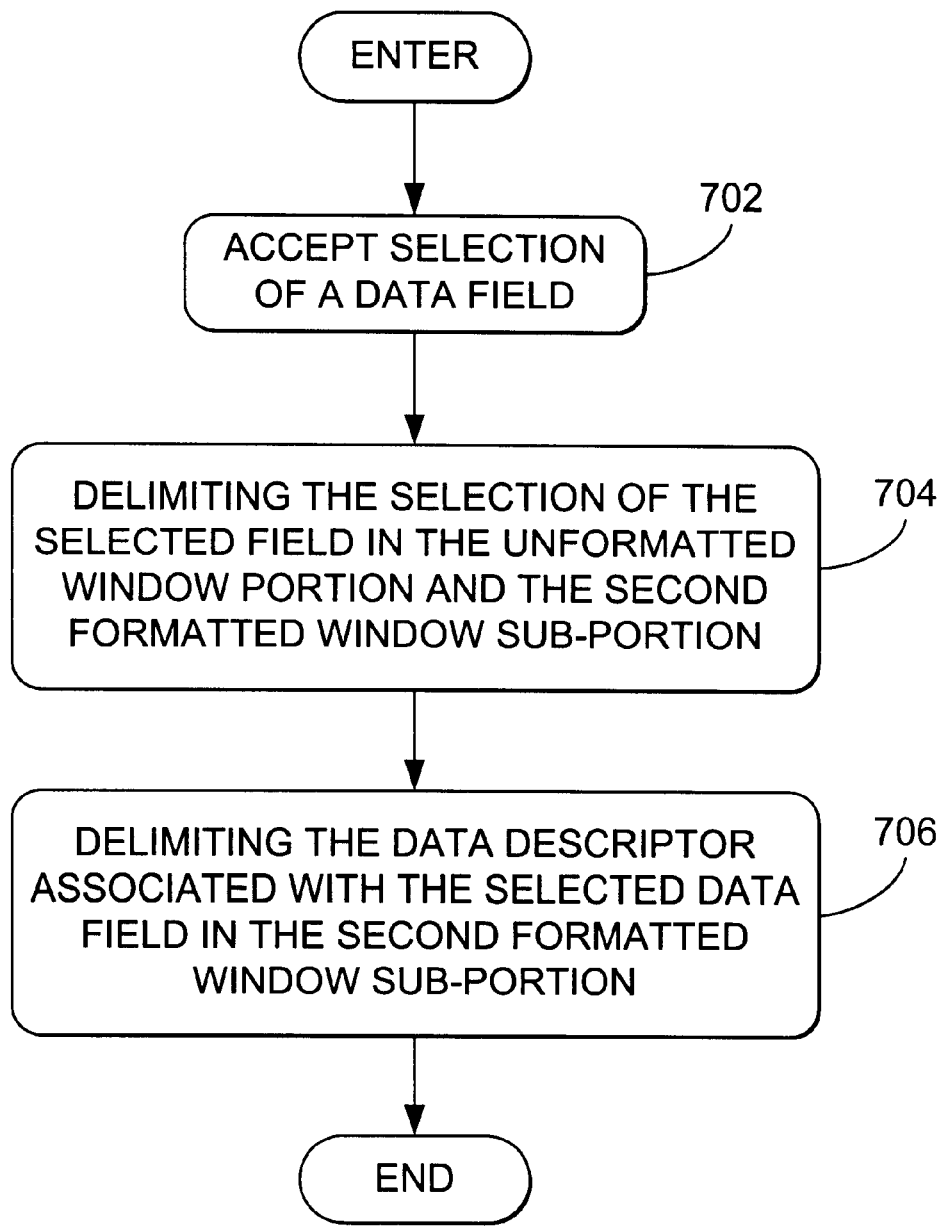
FIG. 7 is a flow chart presenting exemplary process steps employed in accepting a data record and data field selection and presenting the selected data field to the user.

FIG. 7 is a flow chart presenting exemplary process steps employed in accepting a data field selection and presenting the data field. First, a data field selection is accepted 702. This can be accomplished by the methods described with respect to FIG. 8 below. As shown by the logic of block 704, the selected data field is delimited and synchronously updated in the unformatted data window portion 404 and the second formatted window sub-portion 704, and the data descriptor 422 associated with the selected data field is displayed in the first formatted window sub-portion 410. This is represented by the logic of block 706. The delimiting of the field may also include an indication of an attribute of the field. For example, the boundaries of the field can be indicated by highlighting the appropriate characters on the display or by using brackets.

The foregoing can be accomplished by selecting the record and field in the unformatted window portion (in which case, the associated data record and field information is updated and delimited in the formatted window portion), or by selecting the record and field in the formatted window portion (in which case, the associated data record and field in the unformatted window portion is updated and delimited).

Figure 8:
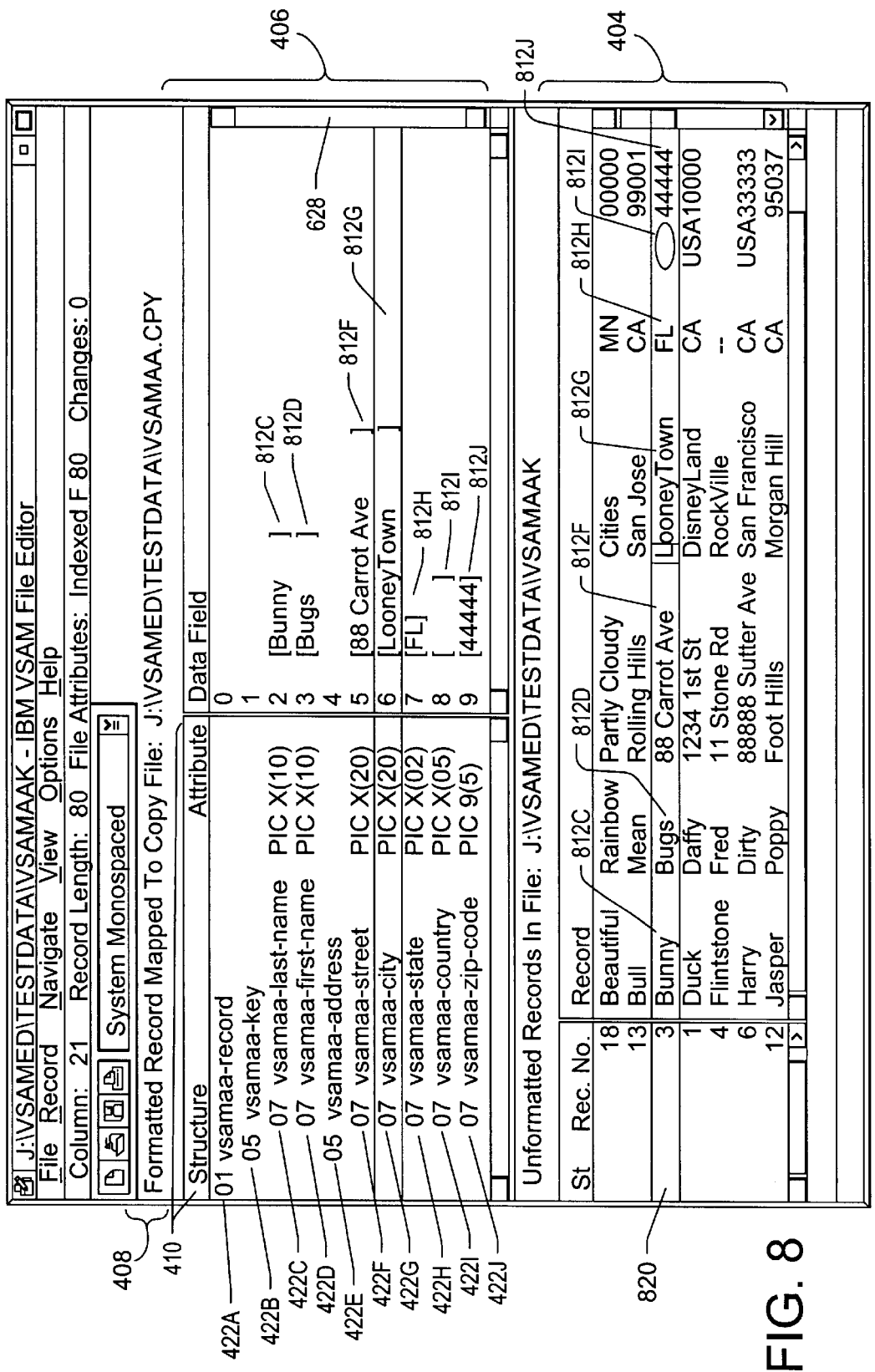
FIG. 8 is a diagram showing an illustrative embodiment of the data file browser/editor after opening a data record and selecting a data field.

FIG. 8 is a diagram showing an illustrative embodiment of the data file browser/editor window 402 after selecting a data field. The formatted data window portion 406 can be used to scroll through the fields of a data record, and to select a data field as the current field. This can be accomplished via manipulation of the scroll bar 628 and clicking on a field in the second formatted window sub-portion 412 or a corresponding data descriptor 422 in the first formatted window sub-portion 410.

When the desired data field is selected, the data field (data field 812G in the example illustrated in FIG. 8) and associated data descriptor 422G are highlighted or otherwise delimited in the formatted data window portion 406.

In one embodiment of the present invention, the data fields 812 within a record are also delimited. This presents a semi-formatted view of the data record to the user in the unformatted data window portion 404. In the example shown in FIG. 8, the selected data field 812G within the record is indicated by highlighting and positioning the cursor at the first character in the selected data field 812. Alternatively, the entire selected data field 812G can be highlighted. Other ways of delimiting the selected data field are also possible. For example, the selected data fields 812 can be delimited by brackets ("[ ]") surrounding the data field, by painting the selected data fields 812 a different color than the other data fields in the data record, or by other means. In any case, the delimiting data fields 812 allows the user to see the boundaries of the data fields 812. This semi-formatted view is useful for experienced users, since it presents enough information to allow users to modify or edit the record (it allows the user to see where data fields begin and end), and yet takes less display real estate than the fully formatted view. It is envisioned that sophisticated users will generally edit data records from this view alone, resorting to the formatted view in the formatted data window portion 406 only when necessary. The formatted window portion 406 is synchronized with the unformatted window portion 404. Hence, corresponding data fields 812 and data descriptor 422 are presented in both the formatted data window portion and unformatted data window portion at the same time.

Modifying Data Records and Fields

Figure 9:
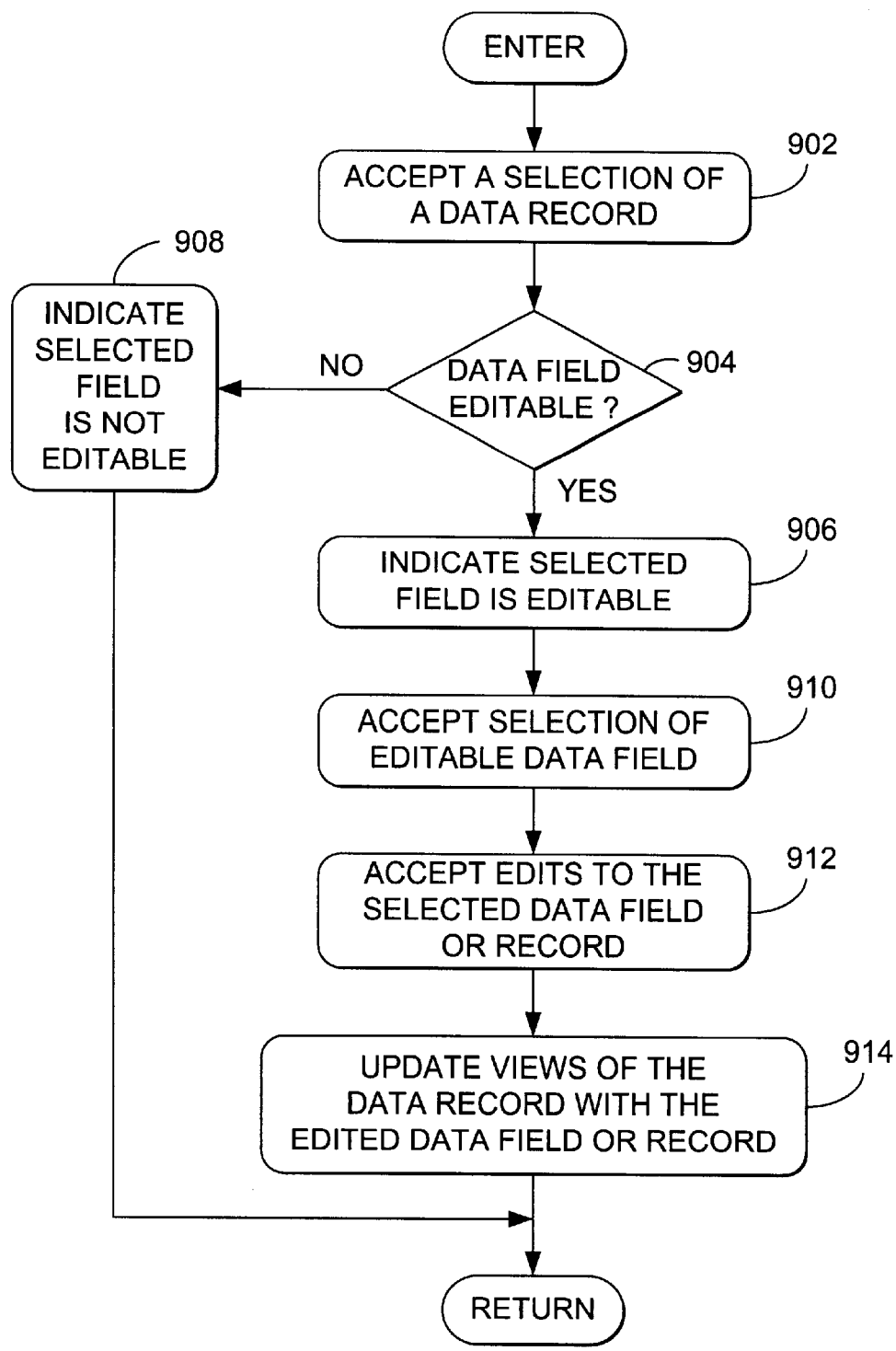
FIG. 9 is a flow chart presenting exemplary process steps employed in editing a data field.

FIG. 9 is a flow chart showing exemplary steps performed in modifying data records and fields. Data records can be edited or modified by from the formatted data window portion 406 or the unformatted data window portion 404.

To modify a data record in the unformatted data window 404, the record to be edited is designated and opened in the unformatted data window 404. This is shown in block 902. This can be accomplished either by double clicking on the record, or by selecting the record with the mouse 116, and selecting the Record item menu on the menu bar 416, and selecting the Edit Record menu item. This opens an entry field 820 in the unformatted data window portion 404. The formatted data window portion 406 and the unformatted data window portion 404 then synchronously display the data fields of the selected data record. Editable and non-editable fields are identified 904, and each field's status is indicated in the view, as shown in blocks 906 and 908. By way of example, FIG. 8 shows a blocked cursor in data fields 812C, 812D, and 812F–812J showing that each of these data fields are editable. The information defining which fields in the data record are editable is obtained in the copy file 150. Editable data fields can also be indicated by placing brackets around the editable field, or by shading the editable field a different color than the unformatted data window portion 404 background. In one embodiment, the view also indicates the character length of each data record. This character length can also be represented, either by brackets around the data field (rather than the data), or shading. The shading technique maximizes use of the unformatted data window 404 space because it does not require additional characters.

Then, the user can either use the mouse 116 or the keyboard cursor control or tab key to position the cursor to select 912 an editable data field. Then, edits to the field such as additions, deletions, or modifications are entered with the keyboard 114, and accepted 912 by the computer 102.

After the edits are completed, the user can click the mouse outside the entry field, or select the keyboard 114 enter key to close the entry field and accept the data changes. After the data is entered, views of the data record are synchronously updated 914 where displayed in the window 402. In embodiments using the unformatted data window portion 404 and the formatted data window portion 406, both window portions are updated. This keeps the data synchronized in both window portions.

To modify a field of a data record using the formatted data window portion 406, the data record sought to be modified is displayed by the data file browser/editor window 402 in the formatted window data portion 406. The data field sought to be modified is selected in the formatted window portion 406. This can be accomplished by double-clicking on the selected field or by selecting the Record menu 452 from the menu bar 416 and selecting the Edit Data Field menu item. The data file browser/editor then opens an entry field 812G containing the selected data field. In the illustrative example shown in FIG. 8, the data in the selected data field 812G is "LooneyTown." The keyboard 114 is then used to enter, modify and/or delete data in the field. The user can then indicate that the edit session is complete by clicking outside the entry field.

Deleting a Data Field

Data records can also be deleted using the data file browser/editor 402. This is accomplished by selecting the record to be deleted from the unformatted data window portion 404 of the data file browser/editor 402, and selecting the Record menu 452 of the menu bar 416, and selecting the Delete menu item. The data file editor will then delete the record. Alternatively, the data file editor may prompt the user to verify that the selected record should be deleted.

Adding a Data Record

Data records can also be added to the data file 152 using data file browser/editor window 402. This is accomplished by selecting the record above the location where a new record is to be inserted in the unformatted data window portion 404. Then, the user selects the Record menu 452, then selects the Insert New or Insert Duplicate menu item. The editor then creates a record immediately following the user selected record. If the command was an Insert New command, a new, empty record is created. If the command was an Insert Duplicate record, a duplicate of the selected record is created and inserted. The above-described methods for editing the new record can then be used to alter the new record as desired.

Creating a New Data File

A new data file 152 can also be created using the data file browser/editor window 402. This is accomplished by selecting the File menu 450 to display a menu of file choices, including a New menu item. This opens a new data file dialog box, which is presented on the display 122. Parameters for the new data file are then entered into entry fields presented in the dialog box, including a filename, file system, file organization (e.g. indexed, relative, etc.), record type (fixed length or variable length), and record length. A "create" button in the new data file dialog box is then selected to complete the process. The data file browser/editor window 402 then displays the newly created empty file. The data records are formatted in accordance with the current copy file.

Conclusion

This concludes the description of the preferred embodiments of the present invention. In summary, the present invention describes a method, apparatus, and article of manufacture for displaying a data file with a plurality of records. The apparatus displays a window, comprising two window portions that are synchronized with each other: an unformatted window portion showing unformatted data and a formatted window portion showing the same data formatted according to a data structure described in a data structure file.

The method comprises the steps of opening a first file having file structure information, opening a data file having at least one data record, each with at least one data field, and displaying a single window comprising an unformatted window portion displaying an unformatted view of the data record and a formatted window portion displaying a view of the data record formatted according to the first structure. The article of manufacture comprises a data storage device tangibly embodying instructions to perform these method steps.

The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing discussion discloses the application of the present invention to the display and editing of VSAM files, the invention is not limited to VSAM alone, and can be applied to PL/1, C, C++, FORTRAN, or other programming languages. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of displaying a data file, comprising the steps of:

opening a first file having data file structure information;

opening a data file, the data file comprising at least one data record, each data record having at least one data field;

displaying a window comprising an unformatted window portion displaying an unformatted view of the data record and a formatted window portion displaying a view of the data record formatted according to the data file structure information;

accepting a selection of a data field;

delimiting the selected data field in the unformatted window portion; and delimiting the selected data field in the formatted window portion.

2. The method of claim 1, further comprising the step of interpreting the data records using the data file structure information.

3. The method of claim 1, further comprising the steps of:

accepting a selection of a data record in the unformatted window portion; and displaying the formatted view of the data record in the formatted window portion.

4. The method of claim 3, wherein the first file comprises at least one data descriptor, and the step of displaying the formatted view of the data record in the formatted window portion comprises the steps of:

displaying a hierarchical organization of data elements from the first file in a first formatted window sub-portion; and displaying the data fields of the data record in a second formatted window sub-portion.

5. The method of claim 4, wherein each data element is associated with a data field, and each data element is displayed adjacent to its associated data field.

6. The method of claim 4, wherein the step of delimiting the selected data field in the formatted window portion comprises the steps of:

delimiting the selected data field in the second formatted window sub-portion; and delimiting the data element associated with the selected data field in the first formatted window sub-portion.

7. The method of claim 3, further comprising the steps of:

editing the selected data record in the window; and updating the unformatted window portion and the formatted window portion to display the edited selected data record.

8. The method of claim 1, further comprising the steps of:

accepting a selection of a display mode for the data; and displaying the data according to the selected display mode.

9. A program storage device, readable by computer having a processor and a memory, tangibly embodying one or more programs of instructions executable by the computer to perform the method steps of displaying a data file, the method steps comprising the steps of:

opening a file having data file structure information, opening a data file, the data file comprising at least one data record, each data record having at least one data field;

displaying a window comprising an unformatted window portion displaying an unformatted view of the data record and a formatted window portion displaying a formatted view of the data record;

accepting a selection of a data field;

delimiting the selected data field in the unformatted window portion; and delimiting the selected data field in the formatted window portion.

10. The program storage device of claim 9, wherein the first file comprises at least one data descriptor, and the method steps further comprise the method step of formatting the data records directly from the first file.

11. The program storage device of claim 9, wherein the method steps further comprise the steps of:

accepting a selection of a data record in the unformatted window portion; and displaying the formatted view of the data record in the formatted window portion.

12. The program storage device of claim 11, wherein the first file is a copy file comprising at least one data descriptor, and the method step of displaying the formatted view of the data record in the formatted window portion comprises the method steps of:

displaying a hierarchical organization of data elements from the copy file in a first formatted window sub-portion; and displaying the data fields of the data record in a second formatted window sub-portion.

13. The program storage device of claim 12, wherein each data element is associated with a data field, and each data element is displayed adjacent to its associated data field.

14. The program storage device of claim 12, wherein the step of delimiting the selected data field in the formatted window portion comprises the steps of: delimiting the selected data field in the second formatted window sub-portion; and delimiting the data element associated with the selected data field in the first formatted window sub-portion.

15. The program storage device of claim 13, further comprising the steps of:

editing the selected data field in the window; and updating the unformatted window portion and the formatted window portion to display the edited data field.

16. The program storage device of claim 9, wherein the method steps further comprise the steps of:

accepting a selection of a display mode for the data; and displaying the data according to the selected display mode.

17. The program storage device of claim 16, wherein the display mode is selected from the group comprising ASCII, EBCDIC, and hexadecimal display modes.

18. An apparatus of displaying a data file, comprising:

means for opening a first file having data file structure information;

means for opening a data file, the data file comprising at least one data record, each data record having at least one data field;

means for displaying a window comprising an unformatted window portion displaying an unformatted view of the data record and a formatted window portion displaying a view of the data record formatted according to the data file structure information;

means for accepting a selection of a data field;

means for delimiting the selected data field in the unformatted window portion; and means for delimiting the selected data field in the formatted window portion.

19. The method of claim 18, further comprising the step of interpreting the data records using the data file structure information.

20. The method of claim 18, further comprising the steps of:

accepting a selection of a data record in the unformatted window portion; and displaying the formatted view of the data record in the formatted window portion.

21. The method of claim 20, wherein the first file comprises at least one data descriptor, and the step of displaying the formatted view of the data record in the formatted window portion comprises the steps of:

displaying a hierarchical organization of data elements from the first file in a first formatted window sub-portion; and displaying the data fields of the data record in a second formatted window sub-portion.

22. The method of claim 21, wherein each data element is associated with a data field, and each data element is displayed adjacent to its associated data field.

23. The method of claim 21, wherein the step of delimiting the selected data field in the formatted window portion comprises the steps of:

delimiting the selected data field in the second formatted window sub-portion; and delimiting the data element associated with the selected data field in the first formatted window sub-portion.

24. The method of claim 20, further comprising the steps of:

editing the selected data record in the window; and updating the unformatted window portion and the formatted window portion to display the edited selected data record.

25. The method of claim 18, further comprising the steps of:

accepting a selection of a display mode for the data; and displaying the data according to the selected display mode.

* * * * *

UNITED STATES PATENT AND TRADEMARK OFFICE
CERTIFICATE OF CORRECTION

| | | |
|---|---|---|
| PATENT NO. | : 6,313,834 B1 | Page 1 of 1 |
| DATED | : November 6, 2001 | |
| INVENTOR(S) | : Rebecca Mei-Har Lau, Kevin Jon Poole and Sheila I. Sholars | |

It is certified that error appears in the above-identified patent and that said Letters Patent is hereby corrected as shown below:

<u>Title page,</u>
Insert Item -- [73] Assignee: International Business Corporation., Armonk, NY (US) --

<u>Column 12,</u>
Line 40, after "claim", "13" should read -- 9 --

Signed and Sealed this

Eighth Day of July, 2003

JAMES E. ROGAN
*Director of the United States Patent and Trademark Office*